United States Patent
Kim et al.

(10) Patent No.: US 12,213,172 B2
(45) Date of Patent: Jan. 28, 2025

(54) P2P TRANSMISSION METHOD IN WIRELESS LAN SYSTEM

(71) Applicant: LG ELECTRONICS INC., Seoul (KR)

(72) Inventors: Sanggook Kim, Seoul (KR); Jeongki Kim, Seoul (KR); Jinsoo Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 3 days.

(21) Appl. No.: 18/013,029

(22) PCT Filed: Jun. 29, 2021

(86) PCT No.: PCT/KR2021/008179
§ 371 (c)(1),
(2) Date: Dec. 27, 2022

(87) PCT Pub. No.: WO2022/005165
PCT Pub. Date: Jan. 6, 2022

(65) Prior Publication Data
US 2023/0247666 A1    Aug. 3, 2023

Related U.S. Application Data

(60) Provisional application No. 63/107,381, filed on Oct. 29, 2020, provisional application No. 63/106,903, (Continued)

(51) Int. Cl.
*H04W 72/12* (2023.01)
*H04W 74/0808* (2024.01)
*H04W 84/12* (2009.01)

(52) U.S. Cl.
CPC ....... *H04W 74/0808* (2013.01); *H04W 72/12* (2013.01); *H04W 84/12* (2013.01)

(58) Field of Classification Search
CPC ................................................. H04W 84/12
(Continued)

(56) References Cited

FOREIGN PATENT DOCUMENTS

| | | |
|---|---|---|
| JP | 2021-530127 | 11/2021 |
| KR | 20120089477 | 8/2012 |

(Continued)

OTHER PUBLICATIONS

Office Action in Japanese Appln. No. 2022-580831, mailed on Sep. 19, 2023, 4 pages (with English translation).

(Continued)

*Primary Examiner* — Angel T Brockman
(74) *Attorney, Agent, or Firm* — Fish & Richardson P.C.

(57) ABSTRACT

In a wireless local area network (LAN) system, a transmitting station (STA) may transmit a peer-to-peer (P2P) transmission request frame to an access point (AP). The transmitting STA may receive a P2P transmission response frame from the AP. The transmitting STA may receive a trigger frame from the AP. The trigger frame may include information related to whether same is for an uplink, P2P transmission or both an uplink and P2P transmission. The transmitting STA may transmit data to a receiving STA. The transmitting STA and the receiving STA may be non-AP STAs. The transmitting STA may transmit a null data packet announcement (NDPA) frame and a null data packet (NDP) frame to the receiving STA. The transmitting STA may receive, from the receiving STA, a feedback frame including state information for the channel between the transmitting STA and the receiving STA.

15 Claims, 16 Drawing Sheets

Related U.S. Application Data filed on Oct. 29, 2020, provisional application No. 63/046,662, filed on Jun. 30, 2020, provisional application No. 63/045,808, filed on Jun. 29, 2020.

(58) Field of Classification Search
USPC .......................................................... 370/329
See application file for complete search history.

(56) References Cited

FOREIGN PATENT DOCUMENTS

| WO | WO2012150815 | 11/2012 |
|----|--------------|---------|
| WO | WO2020008049 | 1/2020  |

OTHER PUBLICATIONS

Baron et al., "Direct Link MU transmissions," IEEE 802.11-19/1117r2, Sep. 15, 2019, 11 pages.
Baron et al., "Triggered P2P transmissions," IEEE 802.11-20/0095r1, Mar. 18, 2020, 9 pages.

FIG. 1
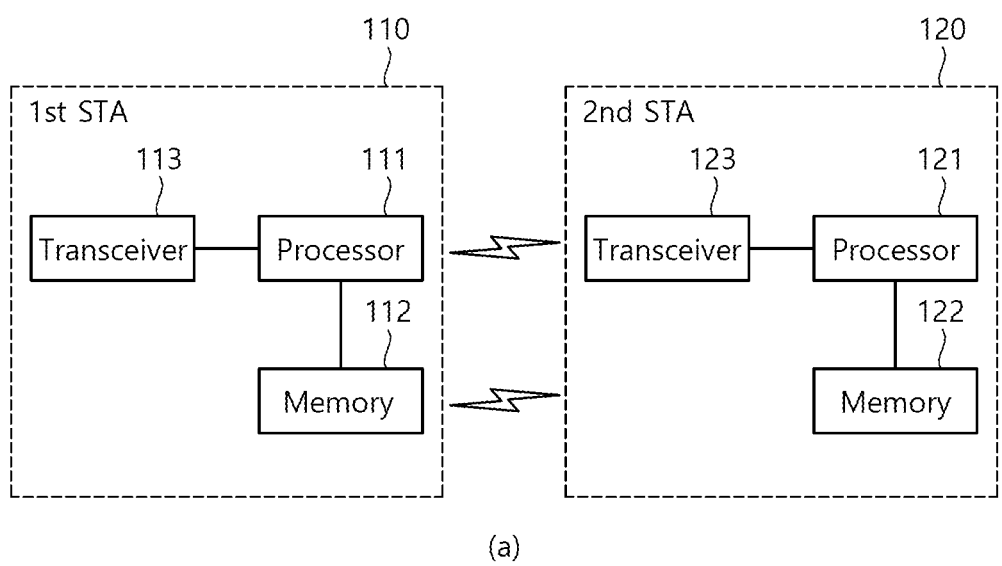
(a)
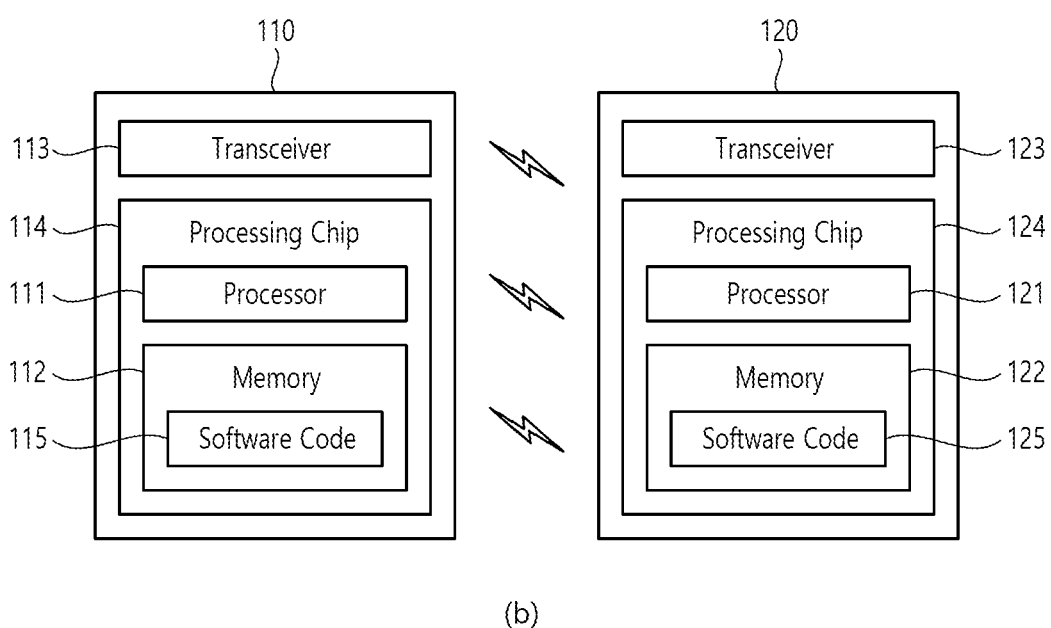
(b)

FIG. 2
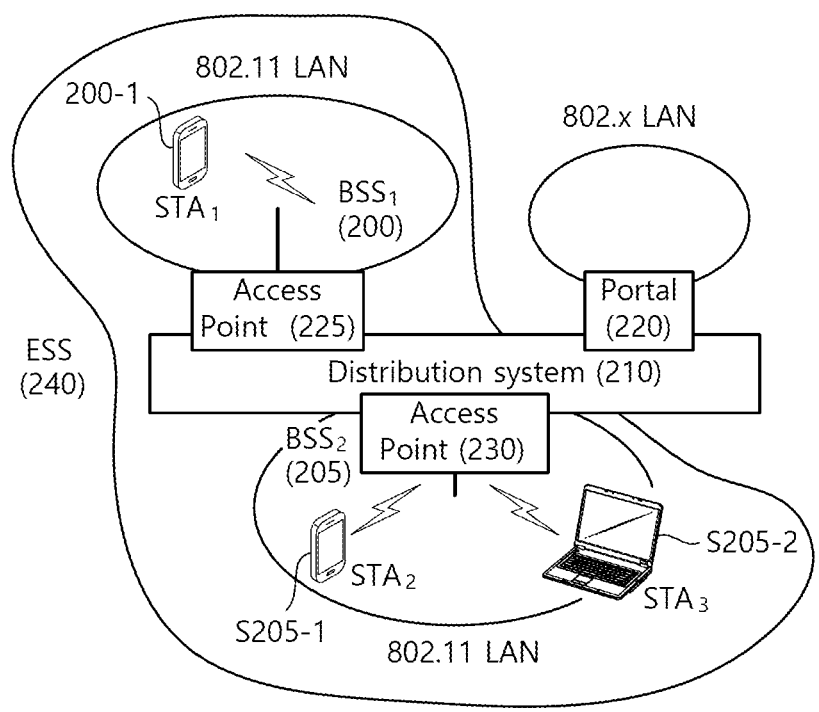
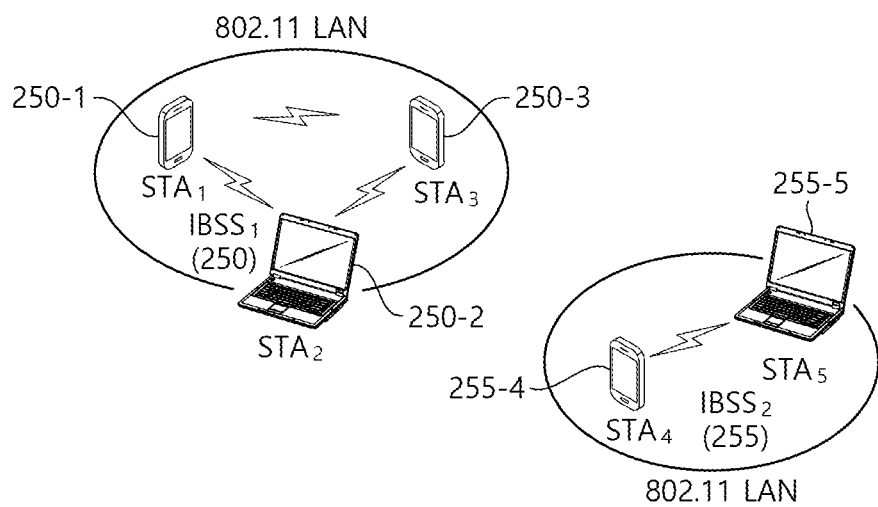

FIG. 5

| L-STF | L-LTF | L-SIG | RL-SIG | U-SIG | EHT-SIG | EHT-STF | EHT-LTF | Data |

P2P TRANSMISSION METHOD IN WIRELESS LAN SYSTEM

CROSS-REFERENCE TO RELATED APPLICATIONS

This application is the National Stage filing under 35 U.S.C. 371 of International Application No. PCT/KR2021/008179, filed on Jun. 29, 2021, which claims the benefit of U.S. Provisional Application No. 63/045,808 filed on Jun. 29, 2020, U.S. Provisional Application No. 63/046,662 filed on Jun. 30, 2020, U.S. Provisional Application No. 63/106,903 filed on Oct. 29, 2020, and U.S. Provisional Application No. 63/107,381 filed on Oct. 29, 2020, the contents of which are all hereby incorporated by reference herein in their entirety.

TECHNICAL FIELD

The present specification relates to a method for peer to peer (P2P) transmission in a wireless local area network (WLAN) system.

BACKGROUND

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

SUMMARY

In a wireless local area network (WLAN) system according to various embodiments, a transmitting station (STA) may transmit a peer-to-peer (P2P) transmission request frame to an access point (AP). A transmitting STA may receive a P2P transmission response frame from the AP. A transmitting STA may receive a trigger frame from the AP. The trigger frame may include information related to whether it is for uplink, P2P transmission, or both uplink and P2P transmission. Through this, unintended STAs can prevent unnecessary power loss by operating in the power save mode during the TXOP obtained by transmitting the trigger frame. P2P transmission may support transmission between one or more transmitting STA and receiving STA pairs. The transmitting STA may transmit data to the receiving STA. The transmitting STA and the receiving STA may be non-AP STAs. The transmitting STA may transmit a null data packet announcement (NDPA) frame and a null data packet (NDP) frame to the receiving STA. The transmitting STA may receive a feedback frame including channel state information between the transmitting STA and the receiving STA from the receiving STA.

According to an example of the present specification, P2P communication can be performed in a WLAN, and even lower delay and improved throughput can be expected by performing direct data transmission and reception between terminals through P2P communication.

According to an example of the present specification, since both P2P transmission and general uplink transmission can be triggered with one trigger frame, communication efficiency can be increased.

BRIEF DESCRIPTION OF THE DRAWINGS

FIG. 1 shows an example of a transmitting apparatus and/or receiving apparatus of the present specification.

FIG. 2 is a conceptual view illustrating the structure of a wireless local area network (WLAN).

FIG. 5 shows an example of a PPDU used in the present specification.

DETAILED DESCRIPTION

Figure 3:
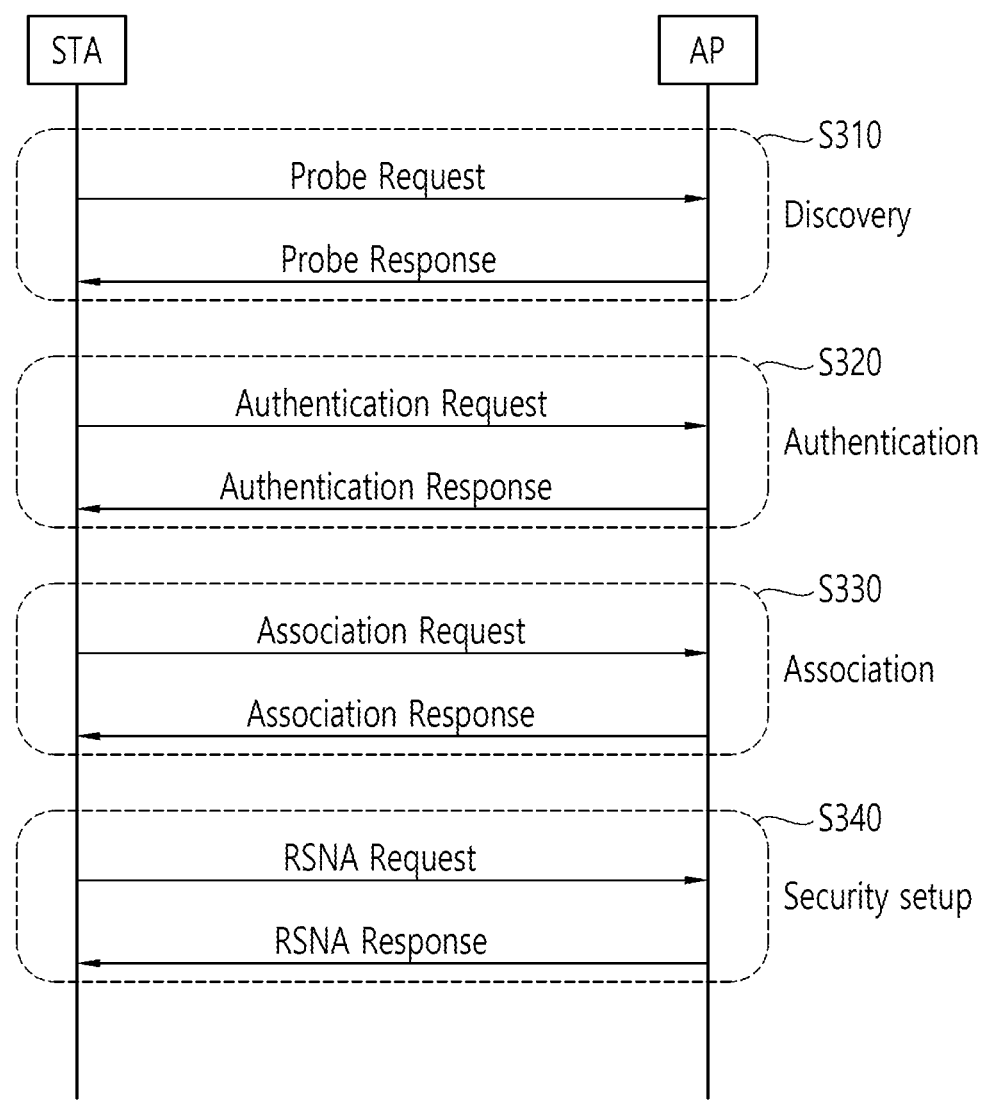
FIG. 3 illustrates a general link setup process.

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may denote that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a $3^{rd}$ generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an AP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

FIG. 2 is a conceptual view illustrating the structure of a wireless local area network (WLAN).

An upper part of FIG. 2 illustrates the structure of an infrastructure basic service set (BSS) of institute of electrical and electronic engineers (i.e., EE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (i.e., EE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBS S.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Figure 4:
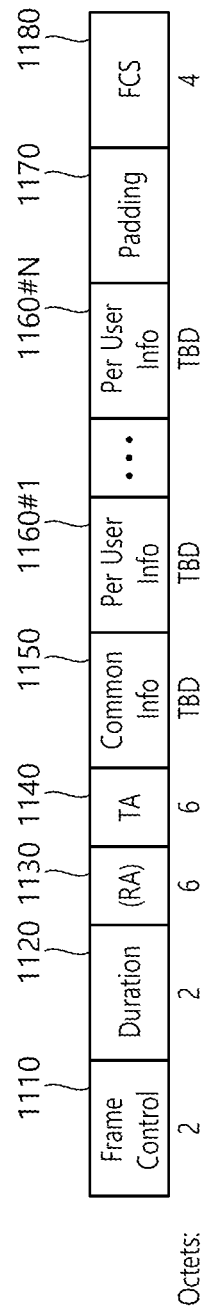
FIG. 4 shows an example of a trigger frame.

FIG. 4 illustrates an example of a trigger frame. The trigger frame of FIG. 4 allocates a resource for uplink multiple-user (MU) transmission, and may be transmitted, for example, from an AP. The trigger frame may be configured of a MAC frame, and may be included in a PPDU.

Each field shown in FIG. 4 may be partially omitted, and another field may be added. In addition, a length of each field may be changed to be different from that shown in the figure.

A frame control field 1110 of FIG. 4 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160 #1 to 1160 #N corresponding to the number of receiving STAs which receive the trigger frame of FIG. 4 are preferably included. The per user information field may also be called an "allocation field".

In addition, the trigger frame of FIG. 4 may include a padding field 1170 and a frame check sequence field 1180.

Each of the per user information fields 1160 #1 to 1160 #N shown in FIG. 4 may include a plurality of subfields.

Hereinafter, a PPDU transmitted/received in a STA of the present specification will be described.

FIG. 5 illustrates an example of a PPDU used in the present specification.

The PPDU of FIG. 5 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 5 may indicate the entirety or part of a PPDU type used in the EHT system. For example, the example of FIG. 5 may be used for both of a single-user (SU) mode and a multi-user (MU) mode. In other words, the PPDU of FIG. 5 may be a PPDU for one receiving STA or a plurality of receiving STAs. When the PPDU of FIG. 5 is used for a trigger-based (TB) mode, the EHT-SIG of FIG. 5 may be omitted. In other words, a STA which has received a trigger frame for uplink-MU (UL-MU) may transmit the PPDU in which the EHT-SIG is omitted in the example of FIG. 5.

In FIG. 5, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 5 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 5. The PPDU of FIG. 5 may be used to transmit/receive frames of various types. For example, the PPDU of FIG. 5 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 5 may be used for a management frame. An example of the management frame may include a beacon frame, a (re-)association request frame, a (re-)association response frame, a probe request frame, and a probe response frame. For example, the PPDU of FIG. 5 may be used for a data frame. For example, the PPDU of FIG. 5 may be used to simultaneously transmit at least two or more of the control frame, the management frame, and the data frame.

Figure 6:
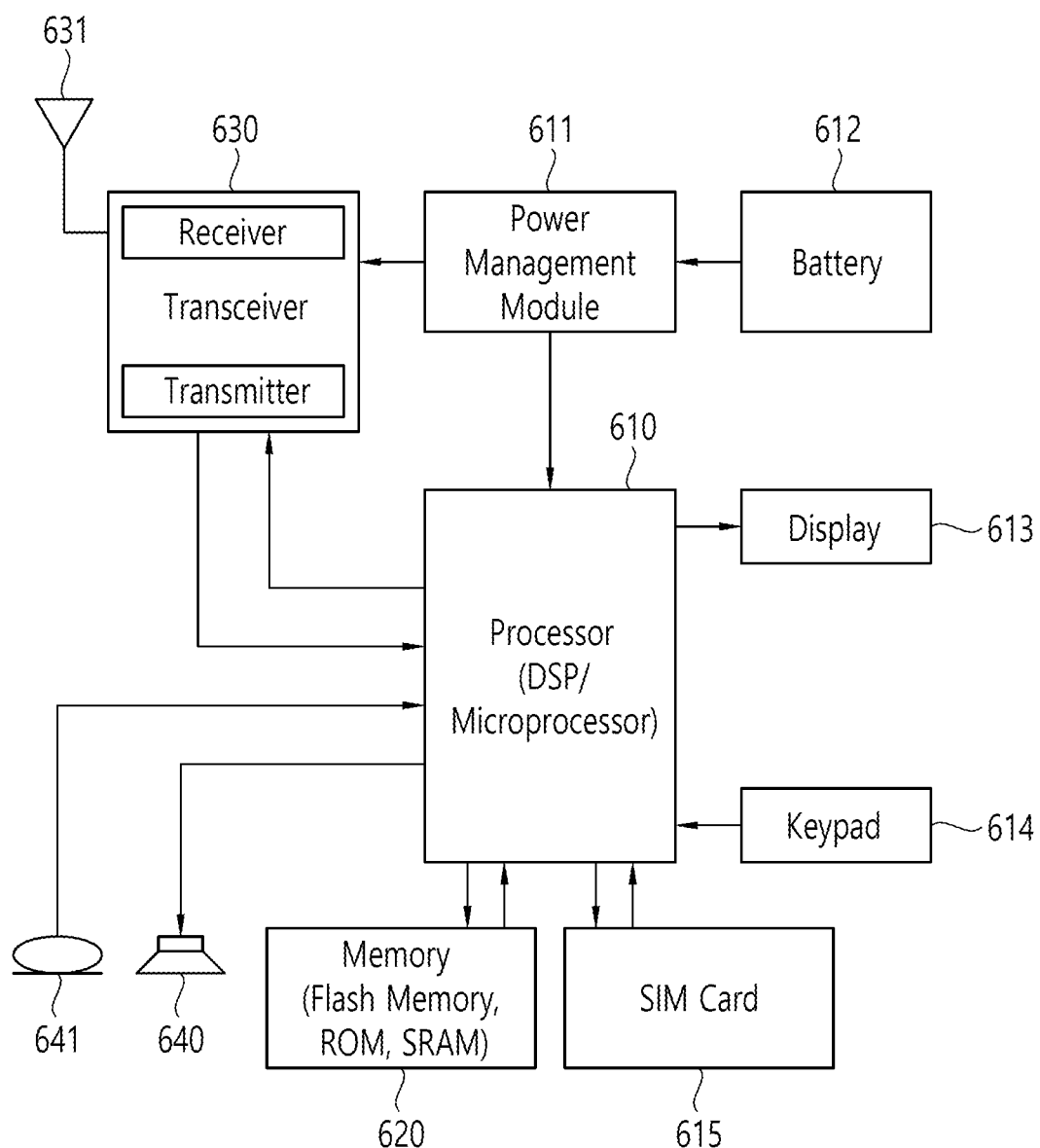
FIG. 6 shows a modified example of the transmitting device and/or receiving device of the present specification.

FIG. 6 shows a modified example of a transmitting apparatus and/or a receiving apparatus of the present specification.

Each device/STA of the sub-drawings (a)/(b) of FIG. 1 could be modified as shown in FIG. 6. The transceiver 630 of FIG. 6 may be the same as the transceivers 113 and 123 of FIG. 1. The transceiver 630 of FIG. 6 may include a receiver and a transmitter.

The processor 610 of FIG. 6 may be the same as the processors 111 and 121 of FIG. 1. Alternatively, the processor 610 of FIG. 6 may be the same as the processing chips 114 and 124 of FIG. 1.

The memory 150 of FIG. 6 may be the same as the memories 112 and 122 of FIG. 1. Alternatively, the memory 150 of FIG. 6 may be a separate external memory different from the memories 112 and 122 of FIG. 1.

Referring to FIG. 6, the power management module 611 manages power for the processor 610 and/or the transceiver 630. The battery 612 supplies power to the power management module 611. The display 613 outputs the result processed by the processor 610. Keypad 614 receives input to be used by processor 610. A keypad 614 may be displayed on the display 613. The SIM card 615 may be an integrated circuit used to securely store an international mobile subscriber identity (IMSI) and its associated keys used to identify and authenticate subscribers in mobile phone devices, such as mobile phones and computers.

Referring to FIG. 6, the speaker 640 may output a sound related result processed by the processor 610. Microphone 641 may receive sound related input to be used by processor 610.

Peer-to-Peer (P2P) communication may have advantages of low delay due to one-hop transmission and high throughput due to a small number of transmissions.

P2P transmission has been adopted in other standards such as 3GPP, but its distributed control nature has delayed its adoption in Wireless Local Area Network (WLAN).

In the present specification, a method for supporting P2P communication in a wireless local area network (WLAN) environment, in particular, an IEEE 802.11 system is proposed.

Figure 7:
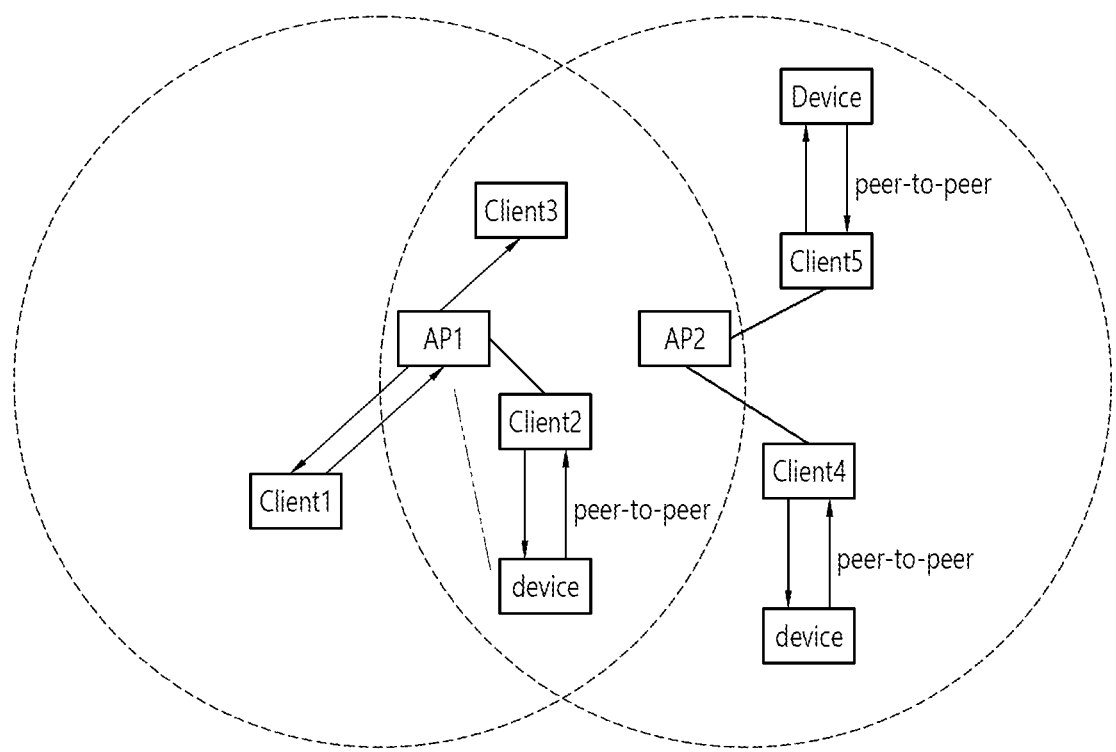
FIG. 7 is a diagram illustrating a communication network according to an example of the present specification.

FIG. 7 is a diagram illustrating a communication network according to an example of the present specification.

Referring to FIG. 7, a client and a device may directly perform P2P communication. Client 2 and Client 4 may be initiators of P2P transmission, and devices may be responders of P2P transmission. The initiator and the device may belong to the same basic service set (BSS), or may belong to different BSSs. Although P2P communication between terminals can be performed, P2P transmission can also be managed by the AP.

Figure 8:
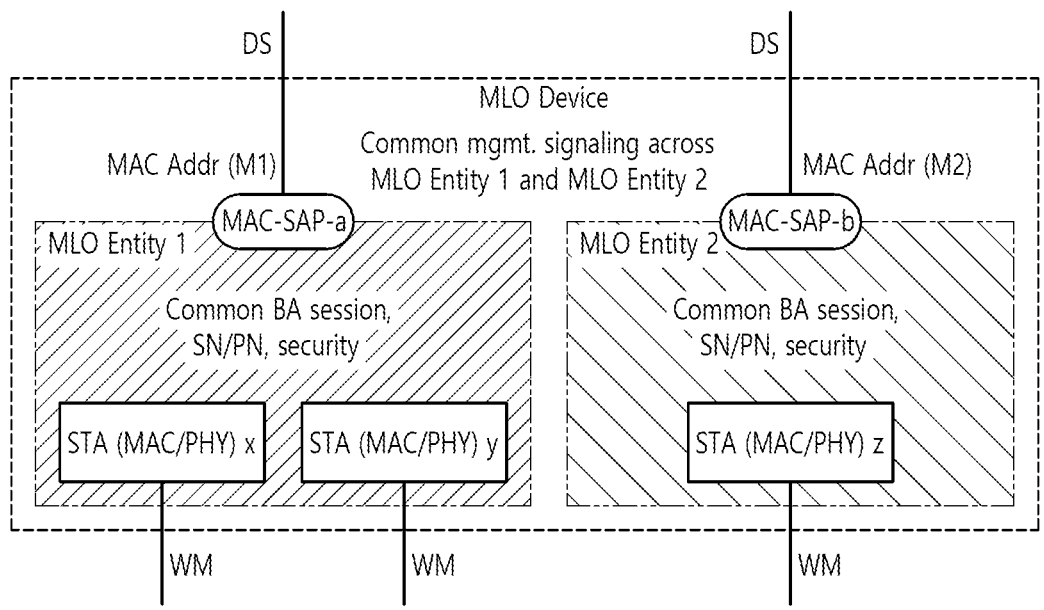
FIG. 8 is a diagram illustrating an example of a multi-link device (MLD) structure.

FIG. 8 is a diagram illustrating an example of a multi-link device (MLD) structure.

Referring to FIG. 8, one STA (MAC/PHY instance) may exist per link. Each STA may have its own MAC/PHY attributes/capabilities for each link. The MAC address of each STA may be the same or different.

A multi-link operation (MLO) entity may be a collection of STAs. An MLO-entity may have an externally addressable unique MAC address that is a MAC-SAP endpoint. All STAs in the MLO entity may have the same BA session, security, and SN/PN.

A multi-link device (MLD) may be a collection of MLO-Entities. An MLD can have multiple MAC-SAP endpoints in DS. For power-saving, common management signaling is available to all MLO-Entities.

STAs performing P2P communication may be non-AP multi-link devices (MLDs). Non-AP MLDs may support the 2.4 GHz, 5 GHz, and/or 6 GHz bands.

Among STAs performing P2P communication, an STA transmitting data may be a P2P source, and an STA receiving data may be a P2P target.

The Non-AP MLD may inform the AP MLD of information (i.e., capability information) related to whether the non-AP MLD supports P2P transmission when associating with the AP MLD.

The AP MLD may maintain tuples related to P2P devices, groups, and/or P2P sessions.

A tuple may be maintained for a P2P session or persistently. If the tuple is continuously maintained, deletion of the tuple may be explicitly requested by the STA or the tuple may be implicitly deleted after a specific duration.

For example, the tuple may include IDs of STAs participating in P2P transmission (e.g., STA ID1 and STA ID2) and P2P information, and the P2P information may include a P2P group ID, a P2P session ID, and the like. The STA ID1 may be an identifier of an initiator (e.g., source and/or group owner) of P2P transmission, and the STA ID2 may be an identifier of a responder (e.g., destination and/or target) of P2P transmission, or vice versa.

When a P2P group and/or session consists of one initiator and one or more responders, two or more STA IDs may be assigned to one tuple.

One STA may be assigned to one or more tuples. That is, an STA may belong to at least one P2P group and/or P2P session.

When the AP MLD allocates resources for P2P transmission, it may indicate which STA will use the corresponding resource. That is, the AP MLD may allocate resources for P2P transmission for each STA. Through this resource allocation, A-PPDU transmission can be performed, and the basic granularity of the sub-PPDU in the A-PPDU may be applied in units of 20 MHz such as 242/484/996/2x996-tone RUs. In addition, there may be cases in which the same STA transmits to different STAs (e.g., STA1 to STA2 and STA3) in units of 20 MHz, and cases in which different STAs transmit to different STAs (for example, STA1 transmits to STA3, and STA2 transmits to STA4) in units of 20 MHz.

When P2P resources are allocated to P2P STAs, the initiator (i.e., source) of P2P transmission may or may not know the channel state between the initiator and responder (i.e., destination or target).

1. Negotiation Phase:

A Non-AP MLD P2P STA having data for P2P transmission may transmit a request to the AP MLD. That is, the Non-AP MLD P2P STA may transmit a P2P transmission request signal to the AP MLD to transmit data through P2P transmission.

The request may include the following information: Source Address (Source Address of itself); Target P2P Non-AP MLD ID (or address) (e.g., Target ID/address may be omitted if P2P Group ID and/or P2P Session ID are included in the request.); P2P Group ID; P2P Session ID; Buffer Status (e.g., Buffer Status Report (BSR)); location information; channel availability information (channel state availability information); and/or channel information, etc.

The location information may be used by the AP MLD to schedule one or more pairs of P2P transmissions. For example, the location information may include information related to the physical/geographic location of a P2P source and/or a P2P target. For example, when the AP MLD schedules two or more pairs of P2P transmissions, the frequency can be reused if STAs of different pairs are located far away, and different time and/or frequency resources can be scheduled to be used if located nearby. When frequency resources are reused, simultaneous transmission may be supported for one or more P2P STA pairs.

The channel availability information may include information related to whether a channel between itself (e.g., an STA that wants to transmit data through P2P transmission such as initiator, source, group owner, etc.) and a target P2P Non-AP MLD STA is available. In this case, it can be notified by what means the channel sounding is performed between the P2P initiator and the responder.

The channel information may include information such as channel status information (CSI), channel quality information (CQI), and received signal strength information (RSSI). Based on the channel information, the AP MLD may determine transmission parameters between the P2P initiator and responder.

When the channel state availability information and/or channel information are omitted, the P2P initiator may perform a channel sounding procedure with the P2P responder.

The channel availability information and/or channel information may be included in an existing frame/element/field (sub-field) or may be included in a new frame/element/field (sub-field). For example, the existing element may be a TSPEC element, a BSR element, and the like.

The AP MLD may transmit an ACK or response to the recommended parameter set. That is, the non-AP MLD may transmit a request signal for P2P transmission to the AP MLD, and the request signal may include a Source Address (Source Address of itself), a Target P2P Non-AP MLD ID (or address) (e.g., Target ID/address may be omitted if P2P Group ID and/or P2P Session ID are included in the request), P2P Group ID, P2P Session ID, Buffer Status (e.g., Buffer Status Report (BSR)), location Information such as location information, channel state availability information, and/or channel information, etc. When the AP MLD receives a request signal from the non-AP MLD, it may transmit a response (e.g., ACK) to the P2P transmission of the non-AP MLD.

Figure 9:
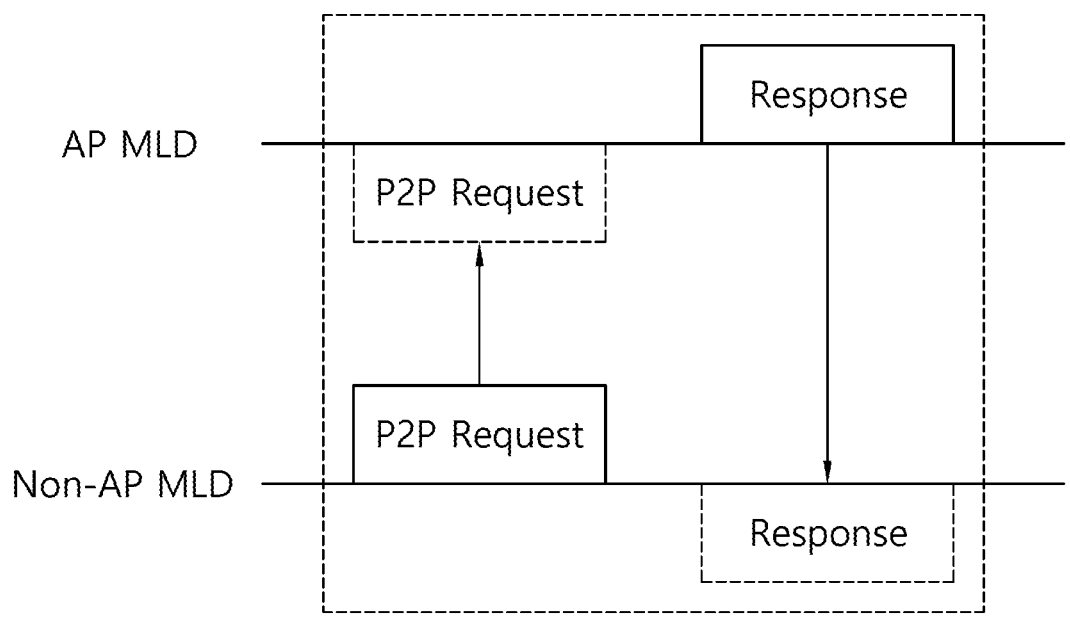
FIG. 9 is a diagram illustrating an embodiment of a negotiation method.

FIG. 9 is a diagram illustrating an embodiment of a negotiation method.

Referring to FIG. 9, the non-AP MLD may transmit a P2P Request frame to the AP MLD. The AP MLD may receive a P2P Request frame from the non-AP MLD and may transmit a Response frame to the non-AP MLD. The Non-AP MLD may receive a Response frame from the AP MLD.

In the embodiment of FIG. 9, only one non-AP MLD is shown for convenience of explanation, but multiple P2P requests can be transmitted during the P2P request interval set by the AP MLD (i.e., P2P requests from multiple non-AP MLDs may be transmitted). When a plurality of P2P requests are transmitted, the response frame may be MU-ACK.

2. P2P Transmission Phase:

Case 1: Case in which the P2P initiator knows the channel between itself and the P2P responder (initial channel sounding is omitted)

A. When the AP MLD obtains a transmission opportunity (TXOP), the AP MLD may indicate whether P2P transmission is scheduled within the corresponding TXOP. That is, when the AP MLD obtains the TXOP, it may transmit information related to whether P2P transmission is performed within the corresponding TXOP. If the P2P transmission is not scheduled, the P2P STA may be in a sleep mode during the corresponding TXOP to save power.

B. When an AP transmits a trigger frame, the AP may indicate in the trigger frame whether there is an allocation for the P2P transmission. That is, the trigger frame may include information related to whether there are resources allocated for the P2P transmission. That is, the trigger frame may include information related to whether or not the P2P transmission is performed. When the P2P transmission is not scheduled, P2P STAs may enter a doze state to save power during the TXOP related to a trigger frame.

Relevant restrictions: When the P2P transmission is not scheduled, P2P STAs associated with the AP that transmitted the trigger frame may enter the doze state during the TXOP related to the trigger frame (i.e., indicated by the trigger frame) to save its power. If only the P2P transmission is scheduled, general STAs (i.e., STAs that do not perform the P2P transmission) associated with the AP which has transmitted the trigger frame may enter the doze state during the TXOP indicated in the trigger frame.

C. The AP MLD may transmit a trigger frame including information for P2P transmission. The trigger frame can be delivered as a (Unicast) single user PPDU or (Broadcast) multiuser PPDU. The P2P transmission may be performed using an uplink and/or downlink orthogonal frequency division multiplexing access (OFDMA) method(s), or an OFDM method. A-PPDU transmission can be performed through this P2P transmission, and the basic granularity of sub-PPDUs in the A-PPDU may be set to 20 MHz such as 242/484/996/2x996-tone RUs. In addition, there may be cases in which the same STA transmits to different STAs (e.g., STA1 to STA2 and STA3) in units of 20 MHz, and cases in which different STAs transmit to different STAs (for example, STA1 transmits to STA3, and STA2 transmits to STA4) in units of 20 MHz.

a. The trigger frame may be transmitted at the beginning of the TXOP obtained by the AP MLD, or may be transmitted during the TXOP after the general traffic exchange is completed. That is, a trigger frame may be transmitted after the general traffic is transmitted first during the TXOP.

b. If the trigger frame is transmitted at the beginning of the TXOP obtained by the AP MLD, the TXOP may be allocated for the P2P traffic, and the remaining TXOP duration may be used for the general traffic exchange.

c. When a trigger frame is transmitted after the general traffic exchange is completed during the TXOP obtained by the AP MLD, the remaining TXOP duration may be used for P2P traffic exchange.

d. As the trigger frame, an existing trigger frame or a newly designed trigger frame for the P2P transmission may be used.

e. The trigger frame may include information (e.g., an indicator) related to whether the corresponding trigger frame is for the general transmission or the P2P transmission.

f. The trigger frame may be used for multi-link transmission, and hybrid transmission for the general transmission and the P2P transmission may be possible in a link during a given time.

i) For example, in the multi-link and hybrid transmissions, the P2P transmission uses the 6 GHz band, the general transmission uses the 2.4 GHz and 5 GHz bands, and some general traffic can be allocated within the link.

ii) Another possible embodiment of the hybrid transmission is that the P2P transmission uses the 5 GHz and 6 GHz bands, and the general transmission uses the 2.4 GHz band, and some general traffic can be allocated within the link.

g. When an existing frame, element, or field (or subfield) is used, a 2-bit indicator may be used. For example, if the 2-bit indicator is set to "00", it may mean general transmission; if it is set to "01", it may mean P2P transmission; if it is transmitted to "10", it may mean hybrid transmission; and if it is set to "11", it may mean a reserved value.

h. When a new frame, element, or field (or subfield) is used, a 1-bit indicator may be used. For example, when the 1-bit indicator is set to "0", it may mean the P2P transmission; and when it is set to "1", it may mean the hybrid transmission.

D. The trigger frame may include information related to P2P transmission.

a. For example, the trigger frame includes: information related to whether it is related to the general transmission, P2P transmission, or hybrid transmission; duration information; band (2.4 GHz, 5 GHz, and/or 6 GHz); channel and bandwidth information; resource (e.g., resource unit) allocation information of P2P sources (e.g., initiator, group owner); address of destination (e.g., target, responder) (it can be omitted if P2P group ID and/or session ID are present); resource information for ACK transmission of the P2P transmission; modulation and coding scheme (MCS); number of space time stream (NSTS); channel sounding information; and/or the like.
b. The above information may be for at least one P2P transmission. A series of information may be transmitted for each P2P group and/or session.
c. The channel sounding information may be set when the time between scheduling request and actual scheduling exceeds a predefined time or when a service using P2P allocation requires a large amount of data, such as VR applications and services. In this case, each service may be classified according to whether initial sounding is required.
d. The 1-bit information may be related to initial sounding or not, and multi-bit information may be related to a channel sounding period. For example, if the 1-bit information is set to zero (0) and the multi-bit value is set to eight (8), then the sounding may be performed for every eight (8) P2P transmissions including the initial transmission, and initial sounding may be omitted.
e. The sounding-related information may be determined by a P2P initiator (or transmitter) and transmitted to a peer P2P STA (e.g., responder or receiver).
E. A target (e.g., destination or responder) P2P device receiving a signal transmitted from a source (e.g., initiator or group owner) may transmit a response signal (e.g., ACK or block ACK (BA)).

Figure 10:
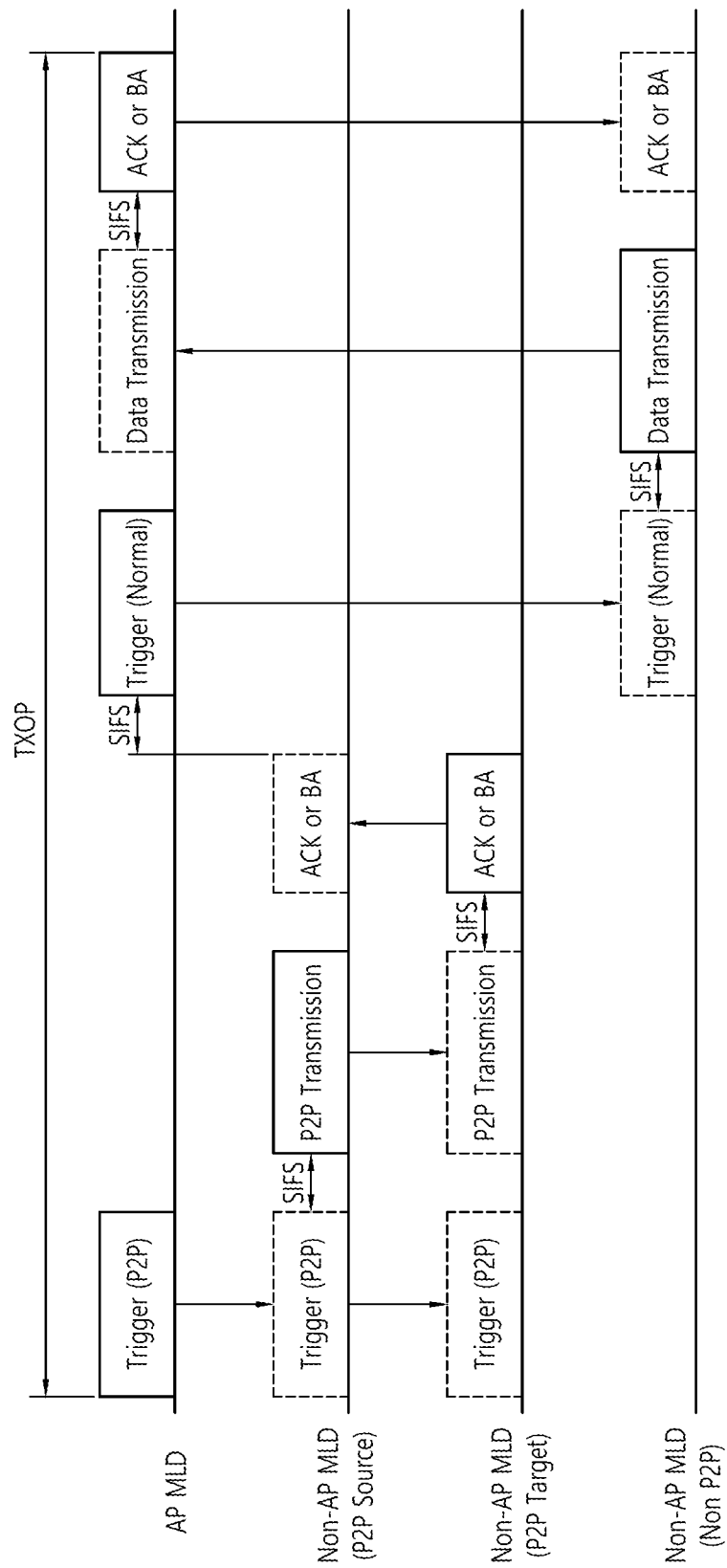
FIG. 10 is a diagram illustrating an embodiment of a P2P transmission method.

FIG. 10 is a diagram illustrating an embodiment of a P2P transmission method.

Referring to FIG. 10, the AP MLD may be a TXOP holder, that is an entity that has obtained the TXOP, and may trigger the P2P transmission when the TXOP starts, followed by general uplink transmission. Alternatively, for example, the AP MLD may trigger general transmission first, followed by the P2P transmission.

The AP MLD may transmit a P2P trigger frame to non-AP MLDs which are a P2P source and a P2P target. Upon receiving the P2P trigger frame, the P2P source may perform the P2P transmission. That is, the P2P source may transmit P2P data to the P2P target. Upon receiving the P2P transmission, the P2P target may transmit a response signal (e.g., ACK or BA).

The AP MLD may perform the general transmission rather than the P2P transmission within the same TXOP. For example, the AP MLD may transmit a trigger frame to a non-AP MLD (Non-P2P device) after the P2P transmission is completed, and the non-AP MLD may transmit data to the AP MLD. The AP MLD may receive uplink data and may transmit a response signal (i.e., ACK or BA) for this.

Figure 11:
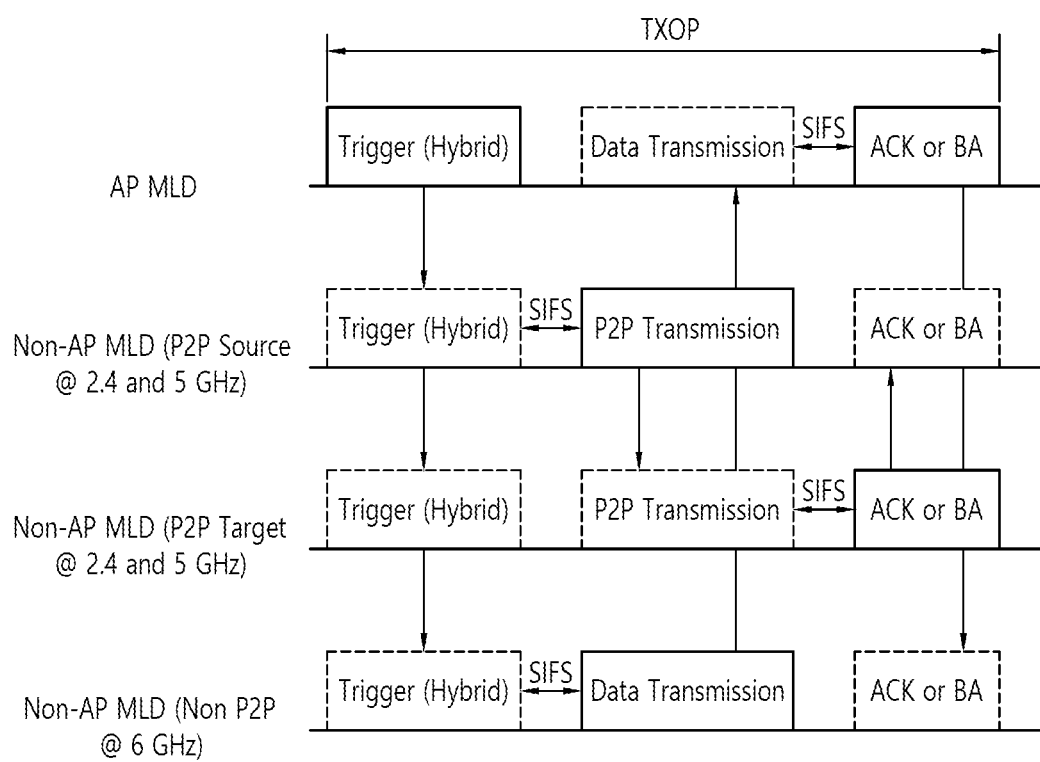
FIG. 11 is a diagram illustrating an embodiment of a P2P transmission method.

FIG. 11 is a diagram illustrating an embodiment of a P2P transmission method.

Referring to FIG. 11, the AP MLD is a TXOP holder, that is an entity that has obtained the TXOP, and can trigger multi-link hybrid transmission when the TXOP starts. The P2P transmission uses the 2.4 GHz and 5 GHz bands, and the general transmission can use the 6 GHz band. The band for each transmission is only an example for convenience of description and is not limited thereto. A trigger frame may be transmitted on each link. For example, a trigger frame transmitted in the 5 GHz band and a trigger frame transmitted in the 6 GHz band may be different.

The AP MLD may transmit a hybrid trigger frame. The hybrid trigger frame can allocate resources for the P2P transmission to non-AP MLDs that are a P2P source and a P2P target, and allocate resources for uplink data transmission to non-AP MLDs that perform a non-P2P transmission (i.e., general transmission).

A P2P source may perform the P2P transmission to a P2P target. The P2P target may receive data from the P2P source through the P2P transmission and may transmit a response signal (e.g., ACK or BA).

The Non P2P Non-AP MLD may transmit uplink data to the AP MLD. The AP MLD may receive uplink data and may transmit a response signal (e.g., ACK or BA).

Case 2: Case in which the P2P Initiator does not Know the Channel Between Itself and the P2P Responder (Initial Channel Sounding can be Performed)

A. When the AP MLD obtains a transmission opportunity (TXOP), the AP MLD may indicate whether P2P transmission is scheduled within the corresponding TXOP. That is, when the AP MLD obtains the TXOP, it may transmit information related to whether P2P transmission is performed within the corresponding TXOP. If the P2P transmission is not scheduled, the P2P STA may be in a sleep mode during the corresponding TXOP to save power.
B. When an AP transmits a trigger frame, the AP may indicate in the trigger frame whether there is an allocation for the P2P transmission. That is, the trigger frame may include information related to whether there are resources allocated for the P2P transmission. That is, the trigger frame may include information related to whether or not the P2P transmission is performed. When the P2P transmission is not scheduled, P2P STAs may enter a doze state to save power during the TXOP related to a trigger frame.

Relevant restrictions: When the P2P transmission is not scheduled, P2P STAs associated with the AP that transmitted the trigger frame may enter the doze state during the TXOP related to the trigger frame (i.e., indicated by the trigger frame) to save its power. If only the P2P transmission is scheduled, general STAs (i.e., STAs that do not perform the P2P transmission) associated with the AP which has transmitted the trigger frame may enter the doze state during the TXOP indicated in the trigger frame.

C. The AP MLD may transmit a trigger frame including information for P2P transmission. The trigger frame can be delivered as a (Unicast) single user PPDU or (Broadcast) multiuser PPDU. The P2P transmission may be performed using an uplink and/or downlink orthogonal frequency division multiplexing access (OFDMA) method(s), or an OFDM method.
a. The trigger frame may be transmitted at the beginning of the TXOP obtained by the AP MLD, or may be transmitted during the TXOP after the general traffic exchange is completed. That is, a trigger frame may be transmitted after the general traffic is transmitted first during the TXOP.
b. If the trigger frame is transmitted at the beginning of the TXOP obtained by the AP MLD, the TXOP may be allocated for the P2P traffic, and the remaining TXOP duration may be used for the general traffic exchange.
c. When a trigger frame is transmitted after the general traffic exchange is completed during the TXOP obtained by the AP MLD, the remaining TXOP duration may be used for P2P traffic exchange.
d. As the trigger frame, an existing trigger frame or a newly designed trigger frame for the P2P transmission may be used.
e. The trigger frame may include information (e.g., an indicator) related to whether the corresponding trigger frame is for the general transmission or the P2P transmission.

f. The trigger frame may be used for multi-link transmission, and hybrid transmission for the general transmission and the P2P transmission may be possible in a link during a given time.
  i) For example, in the multi-link and hybrid transmissions, the P2P transmission uses the 6 GHz band, the general transmission uses the 2.4 GHz and 5 GHz bands, and some general traffic can be allocated within the link.
  ii) Another possible embodiment of the hybrid transmission is that the P2P transmission uses the 5 GHz and 6 GHz bands, and the general transmission uses the 2.4 GHz band, and some general traffic can be allocated within the link.
g. When an existing frame, element, or field (or subfield) is used, a 2-bit indicator may be used. For example, if the 2-bit indicator is set to "00", it may mean general transmission; if it is set to "01", it may mean P2P transmission; if it is transmitted to "10", it may mean hybrid transmission; and if it is set to "11", it may mean a reserved value.
h. When a new frame, element, or field (or subfield) is used, a 1-bit indicator may be used. For example, when the 1-bit indicator is set to "0", it may mean the P2P transmission; and when it is set to "1", it may mean the hybrid transmission.
D. The trigger frame may include information related to P2P transmission.
  a. For example, the trigger frame includes: information related to whether it is related to the general transmission, P2P transmission, or hybrid transmission; duration information; band (2.4 GHz, 5 GHz, and/or 6 GHz); channel and bandwidth information; resource (e.g., resource unit) allocation information of P2P sources (e.g., initiator, group owner); address of destination (e.g., target, responder) (it can be omitted if P2P group ID and/or session ID are present); resource information for ACK transmission of the P2P transmission; modulation and coding scheme (MCS); number of space time stream (NSTS); channel sounding information; and/or the like.
  b. The above information may be for at least one P2P transmission. A series of information may be transmitted for each P2P group and/or session.
  c. A target (e.g., destination, responder) P2P device receiving information related to P2P transmission from a source (e.g., initiator, group owner) may transmit a response signal (e.g., ACK or BA).
  d. The 1-bit information may be related to initial sounding or not, and multi-bit information may be related to a channel sounding period. For example, if the 1-bit information is set to one (1) and the multi-bit value is set to eight (8), sounding after initial sounding before P2P transmission may be performed every eight (8) P2P transmissions including the initial transmission. In this case, the 1-bit information related to initial sounding may always be set to one (1). That is, initial sounding may always be performed.
  e. The sounding-related information may be determined by a P2P initiator (or transmitter) and transmitted to a peer P2P STA (e.g., responder or receiver).
E. When the P2P transmission starts, the source (e.g., initiator, group owner) P2P device may transmit a null data packet announcement (NDPA) frame and a null data packet (NDP) frame to the target (e.g., destination, responder) P2P device.
F. The target P2P device may deliver measured channel state information. That is, the target P2P device may measure channel state information based on the NDP frame and transmit a feedback frame including the measured channel state information to the source P2P device.
G. Based on the feedback, the source P2P STA may determine transmission parameters (e.g., MCS, NSTS, power, etc.) and perform P2P transmission using the determined parameters.
H. A target (e.g., destination or responder) P2P device receiving a signal transmitted from a source (e.g., initiator or group owner) may transmit a response signal (e.g., ACK or block ACK (BA)).
I. If the P2P transmission is terminated earlier than the scheduled P2P period, the source P2P device may transmit a release signal for terminating the P2P transmission to the AP MLD.

Figure 12:
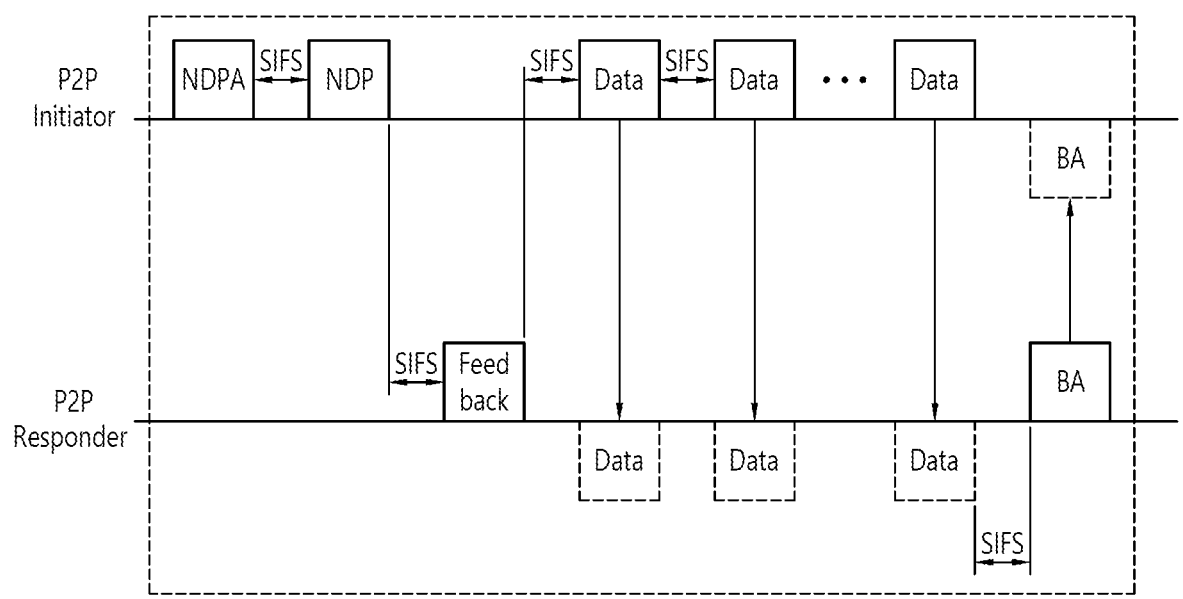
FIG. 12 is a diagram illustrating an embodiment of a P2P transmission method.

FIG. 12 is a diagram illustrating an embodiment of a P2P transmission method.

Referring to FIG. 12, a P2P initiator may transmit NDPA and NDP frames to a P2P responder. The P2P responder may obtain channel state information between the P2P initiator and the P2P responder based on the NDP frame, and may transmit a feedback frame including the channel state information to the P2P initiator.

The P2P initiator may determine transmission parameters based on the feedback frame received from the P2P responder. The P2P initiator may transmit data to the P2P responder based on transmission parameters. Data can be divided and transmitted several times.

The P2P responder receiving all the data may transmit a response frame (e.g., BA frame) for the received data to the P2P initiator.

Figure 13:
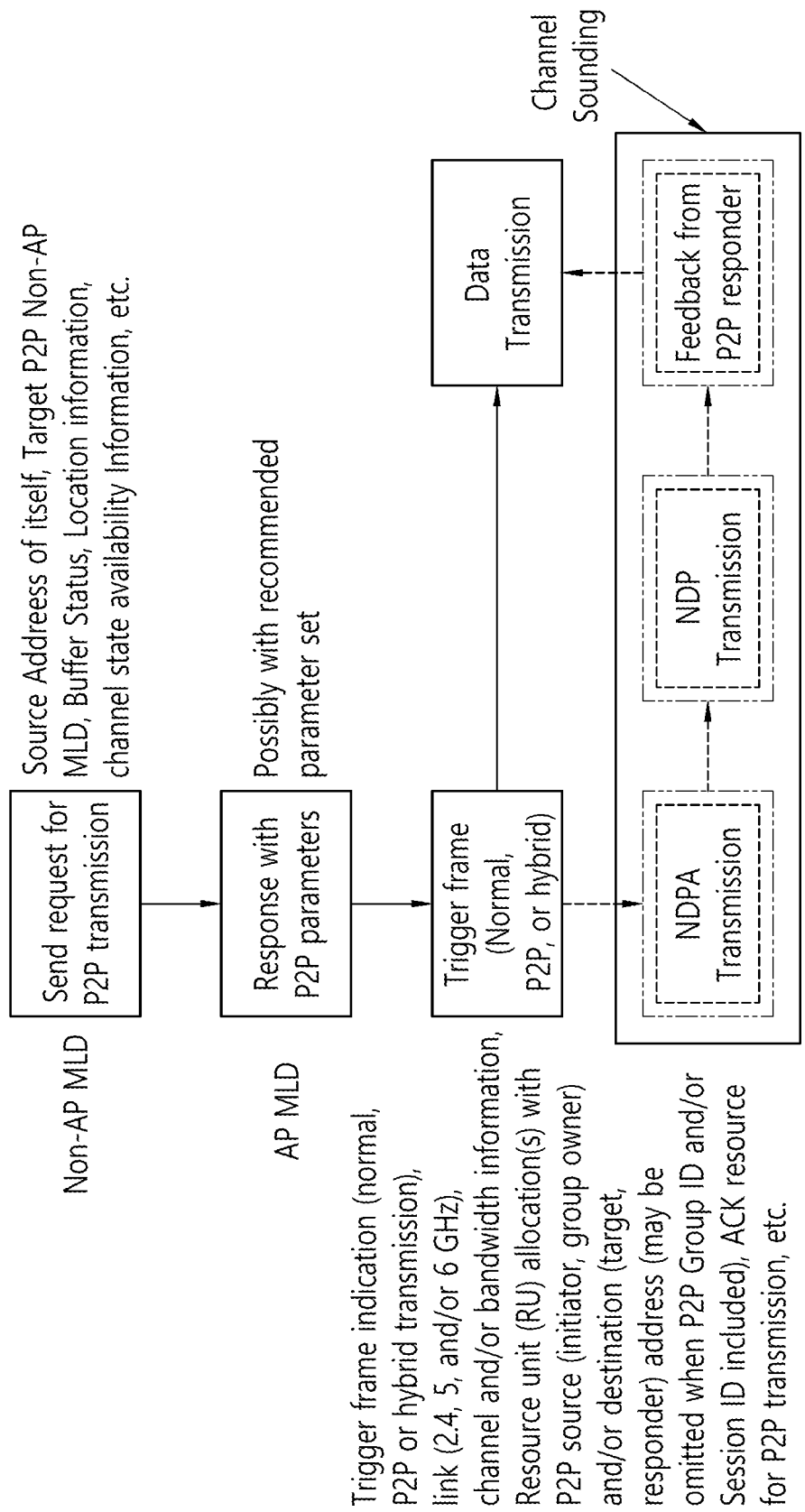
FIG. 13 is a diagram illustrating an embodiment of Case 1.

FIG. 13 is a diagram illustrating an embodiment of Case 1.

Referring to FIG. 13, the P2P initiator can know the channel between itself and the P2P responder. A box marked with a dotted line (i.e., channel sounding) may be performed by an instruction of the AP MLD and/or a determination of the P2P initiator.

The non-AP MLD (i.e., P2P source) may transmit a request for P2P transmission to the AP MLD. The request for the P2P transmission may include a source address, target P2P Non-AP MLD information, buffer status, location information, channel status availability information, and/or the like.

When receiving a request for P2P transmission, the AP MLD may transmit a response signal including transmission parameter information for P2P transmission.

The AP MLD may transmit a trigger frame. For example, the trigger frame includes: information related to whether it is related to the general transmission, P2P transmission, or hybrid transmission; duration information; band (2.4 GHz, 5 GHz, and/or 6 GHz); channel and bandwidth information; resource (e.g., resource unit) allocation information of P2P sources (e.g., initiator, group owner); address of destination (e.g., target, responder) (it can be omitted if P2P group ID and/or session ID are present); resource information for ACK transmission of the P2P transmission; modulation and coding scheme (MCS); number of space time stream (NSTS); channel sounding information; and/or the like.

The trigger frame may be transmitted to both the P2P initiator and the P2P responder. The trigger frame may also be transmitted to MLDs (or STAs) that do not participate in the P2P transmission.

The P2P initiator may receive the trigger frame and perform the P2P transmission with the P2P responder. That is, the P2P initiator may transmit data to the P2P responder in a P2P manner.

Since the P2P initiator already knows channel information with the P2P responder, an initial sounding is not performed. However, only the initial sounding is not performed, and channel sounding may be performed later. For example, the channel sounding may be performed by an instruction of an AP MLD and/or a determination of a P2P initiator.

Channel sounding may include NDPA and NDP transmission by the P2P initiator and feedback transmission by the P2P responder.

For example, channel sounding may be performed whenever data is transmitted a preset number of times.

Figure 14:
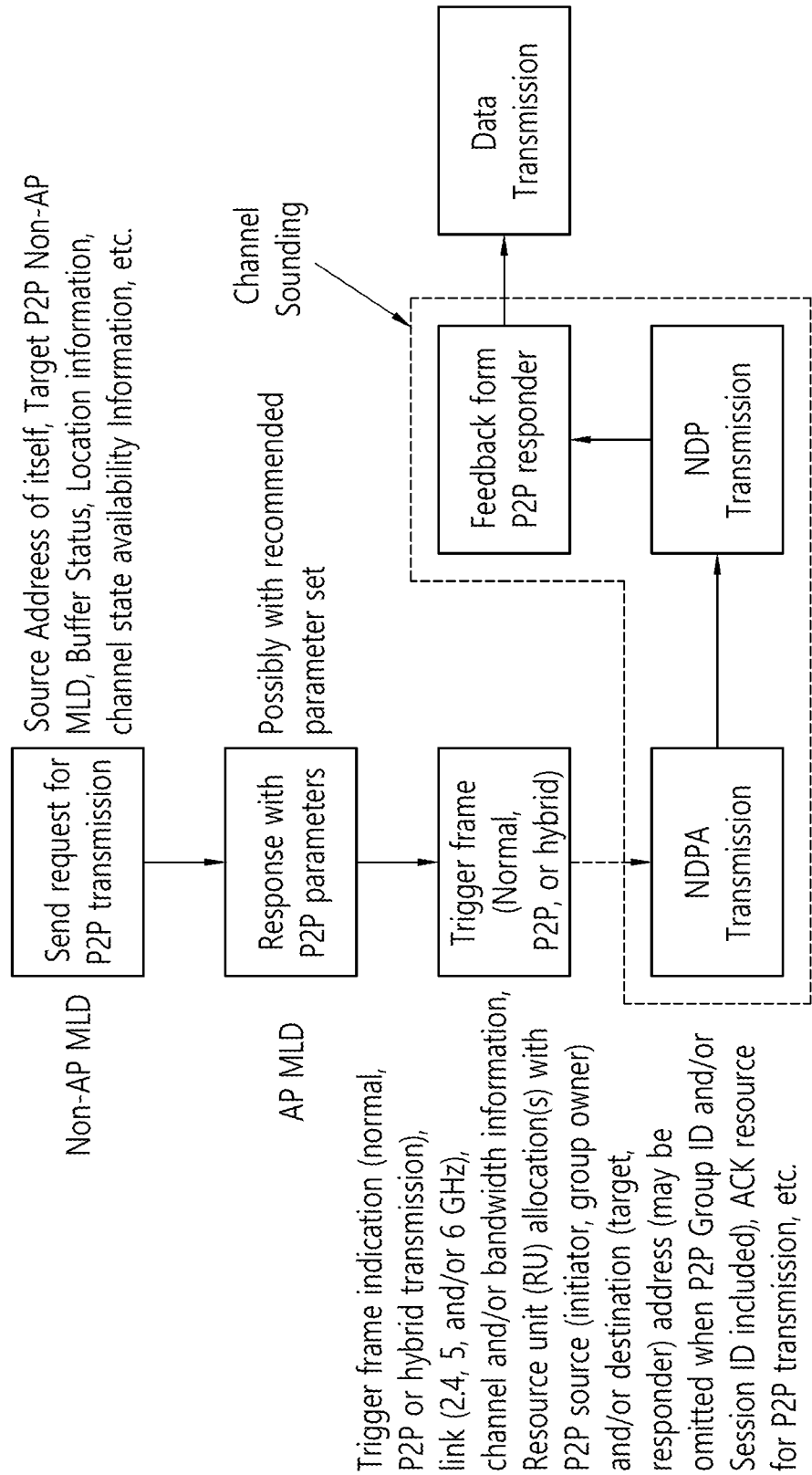
FIG. 14 is a diagram illustrating an embodiment of Case 2.

FIG. 14 is a diagram illustrating an embodiment of Case 2.

Referring to FIG. 14, the P2P initiator does not know the channel between itself and the P2P responder.

The non-AP MLD (i.e., P2P source) may transmit a request for the P2P transmission to the AP MLD. The request for the P2P transmission may include a source address, target P2P Non-AP MLD information, buffer status, location information, channel status availability information, and/or the like.

When receiving a request for the P2P transmission, the AP MLD may transmit a response signal including transmission parameter information for the P2P transmission.

The AP MLD may transmit a trigger frame. For example, the trigger frame includes: information related to whether it is related to the general transmission, P2P transmission, or hybrid transmission; duration information; band (2.4 GHz, 5 GHz, and/or 6 GHz); channel and bandwidth information; resource (e.g., resource unit) allocation information of P2P sources (e.g., initiator, group owner); address of destination (e.g., target, responder) (it can be omitted if P2P group ID and/or session ID are present); resource information for ACK transmission of the P2P transmission; modulation and coding scheme (MCS); number of space time stream (NSTS); channel sounding information; and/or the like.

The trigger frame may be transmitted to both the P2P initiator and the P2P responder. The trigger frame may also be transmitted to MLDs (or STAs) that do not participate in the P2P transmission.

The P2P initiator may receive a trigger frame, and an initial channel sounding may be performed. Since the P2P initiator does not know channel information with the P2P responder, the initial sounding should be performed.

The channel sounding may include NDPA and NDP transmissions by the P2P initiator and feedback transmission by the P2P responder.

That is, the P2P initiator may transmit NDPA and NDP frames to the P2P responder. Upon receiving the NDP frame, the P2P responder may obtain channel information between the P2P initiator and the P2P responder. The P2P responder may transmit a feedback frame including obtained channel information to the P2P initiator.

Thereafter, the P2P initiator may perform P2P transmission with the P2P responder. That is, the P2P initiator may transmit data to the P2P responder in a P2P manner.

Even after that, channel sounding may be performed. For example, channel sounding may be performed by an instruction of an AP MLD and/or a determination of a P2P initiator. For example, channel sounding may be performed whenever data is transmitted a preset number of times.

Figure 15:
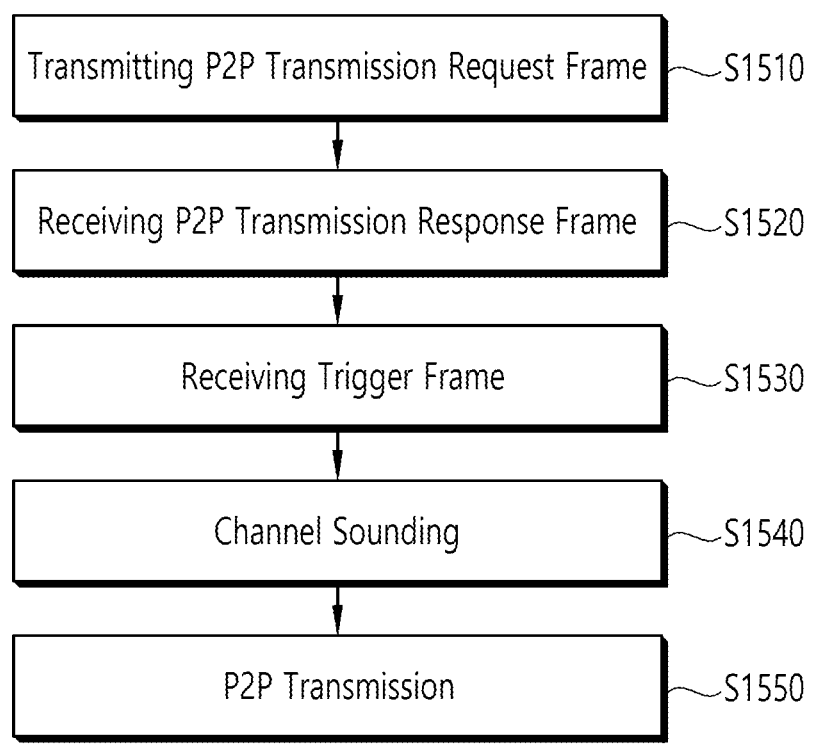
FIG. 15 is a diagram illustrating an embodiment of a method of operating a transmitting STA.

FIG. 15 is a diagram illustrating an embodiment of a method of operating a transmitting STA.

Referring to FIG. 15, a transmitting STA operation may be based on technical features described in at least one of FIGS. 1 to 14.

The transmitting STA may transmit a peer-to-peer (P2P) transmission request frame (S1510). For example, the transmitting STA may transmit a P2P transmission request frame to an access point (AP).

For example, the P2P transmission request frame may include the address of the transmitting STA that is a P2P source, the address of the receiving STA that is a P2P target, buffer status information of the transmitting STA, and/or channel availability information.

A Non-AP MLD P2P STA having data for P2P transmission may transmit a request to the AP MLD. That is, the Non-AP MLD P2P STA may transmit a P2P transmission request signal to the AP MLD to transmit data through P2P transmission.

The request may include the following information: Source Address (Source Address of itself); Target P2P Non-AP MLD ID (or address) (e.g., Target ID/address may be omitted if P2P Group ID and/or P2P Session ID are included in the request.); P2P Group ID; P2P Session ID; Buffer Status (e.g., Buffer Status Report (BSR)); location information; channel availability information (channel state availability information); and/or channel information, etc.

The location information may be used by the AP MLD to schedule one or more pairs of P2P transmissions. For example, the location information may include information related to the physical/geographic location of a P2P source and/or a P2P target. For example, when the AP MLD schedules two or more pairs of P2P transmissions, the frequency can be reused if STAs of different pairs are located far away, and different time and/or frequency resources can be scheduled to be used if located nearby.

The channel availability information may include information related to whether a channel between itself (e.g., an STA that wants to transmit data through P2P transmission such as initiator, source, group owner, etc.) and a target P2P Non-AP MLDSTA is available. In this case, it can be notified by what means the channel sounding is performed between the P2P initiator and the responder.

The channel information may include information such as channel status information (CSI), channel quality information (CQI), and received signal strength information (RSSI). Based on the channel information, the AP MLD may determine transmission parameters between the P2P initiator and responder.

When the channel state availability information and/or channel information are omitted, the P2P initiator may perform a channel sounding procedure with the P2P responder.

The transmitting STA may receive the P2P transmission response frame (S1520). For example, the transmitting STA may receive a P2P transmission response frame from the AP.

The transmitting STA may receive a trigger frame (S1530). For example, a transmitting STA may receive a trigger frame from the AP. The trigger frame may include information related to whether it is for uplink, P2P transmission, or both uplink and P2P transmission.

For example, the trigger frame may include uplink transmission schedule information and P2P transmission schedule information.

For example, the trigger frame may further include resource allocation information and P2P transmission duration information for the P2P transmission between the transmitting STA and the receiving STA.

For example, the trigger frame may include information related to initial sounding and sounding period information, the information related to initial sounding may be related to whether the transmitting STA performs sounding before transmitting data to the receiving STA, and the sounding period information may be related to how many data transmissions are performed before performing sounding.

For example, the trigger frame may include resource allocation information for P2P transmission between the transmitting STA and the receiving STA, and resource allocation information for transmitting uplink data from an uplink STA to the AP MLD.

The transmitting STA may perform channel sounding (S1540). For example, the transmitting STA may transmit a null data packet announcement (NDPA) frame and a null data packet (NDP) frame to the receiving STA, and the transmitting STA may receive a feedback frame including channel state information between the transmitting STA and the receiving STA from the receiving STA.

The transmitting STA may perform the P2P transmission (S1550). For example, the transmitting STA may transmit data to the receiving STA. The transmitting STA and the receiving STA may be non-AP STAs.

Figure 16:
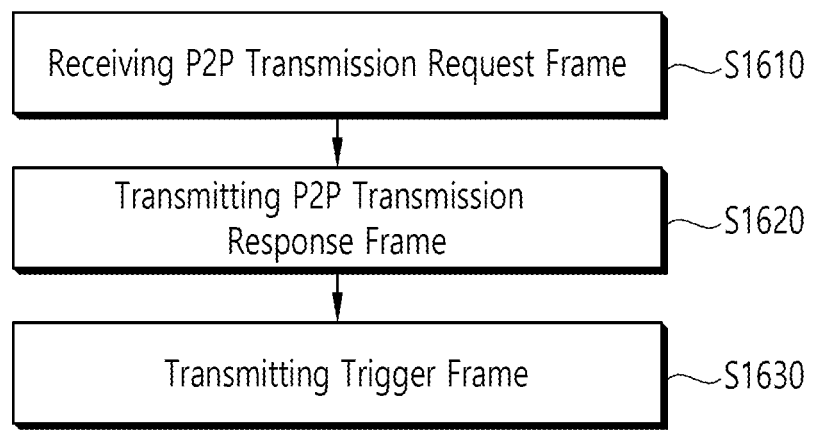
FIG. 16 is a diagram illustrating an embodiment of an AP operation method.

FIG. 16 is a diagram illustrating an embodiment of an AP operation method.

Referring to FIG. 16, an AP operation may be based on technical features described in at least one of FIGS. 1 to 14.

The AP may receive a peer-to-peer (P2P) transmission request frame (S1610). For example, the AP may receive a P2P transmission request frame from a transmitting station (STA).

For example, the P2P transmission request frame may include the address of the transmitting STA that is a P2P source, the address of the receiving STA that is a P2P target, buffer status information of the transmitting STA, and/or channel availability information.

A Non-AP MLD P2P STA having data for P2P transmission may transmit a request to the AP MLD. That is, the Non-AP MLD P2P STA may transmit a P2P transmission request signal to the AP MLD to transmit data through P2P transmission.

The request may include the following information: Source Address (Source Address of itself); Target P2P Non-AP MLD ID (or address) (e.g., Target ID/address may be omitted if P2P Group ID and/or P2P Session ID are included in the request.); P2P Group ID; P2P Session ID; Buffer Status (e.g., Buffer Status Report (BSR)); location information; channel availability information (channel state availability information); and/or channel information, etc.

The location information may be used by the AP MLD to schedule one or more pairs of P2P transmissions. For example, the location information may include information related to the physical/geographic location of a P2P source and/or a P2P target. For example, when the AP MLD schedules two or more pairs of P2P transmissions, the frequency can be reused if STAs of different pairs are located far away, and different time and/or frequency resources can be scheduled to be used if located nearby.

The channel availability information may include information related to whether a channel between itself (e.g., an STA that wants to transmit data through P2P transmission such as initiator, source, group owner, etc.) and a target P2P Non-AP MLDSTA is available. In this case, it can be notified by what means the channel sounding is performed between the P2P initiator and the responder.

The channel information may include information such as channel status information (CSI), channel quality information (CQI), and received signal strength information (RSSI). Based on the channel information, the AP MLD may determine transmission parameters between the P2P initiator and responder.

When the channel state availability information and/or channel information are omitted, the P2P initiator may perform a channel sounding procedure with the P2P responder.

The AP may transmit a P2P transmission response frame (S1620). For example, the AP may transmit a P2P transmission response frame to the transmitting STA.

The AP may transmit a trigger frame (S1630). For example, the AP may transmit a trigger frame to the transmitting STA. The trigger frame may include information related to whether it is for uplink, P2P transmission, or both uplink and P2P transmission.

For example, the trigger frame may include uplink transmission schedule information and P2P transmission schedule information.

For example, the trigger frame may further include resource allocation information and P2P transmission duration information for the P2P transmission between the transmitting STA and the receiving STA.

For example, the trigger frame may include information related to initial sounding and sounding period information, the information related to initial sounding may be related to whether the transmitting STA performs sounding before transmitting data to the receiving STA, and the sounding period information may be related to how many data transmissions are performed before performing sounding.

For example, the trigger frame may include resource allocation information for P2P transmission between the transmitting STA and the receiving STA, and resource allocation information for transmitting uplink data from an uplink STA to the AP MLD.

Some of the detailed steps shown in the examples of FIGS. 15 and 16 may not be essential steps and may be omitted. In addition to the steps shown in FIGS. 15 and 16, other steps may be added, and the order of the steps may be changed. Some of the above steps may have their own separate technical meaning.

The technical features of the present specification described above may be applied to various devices and methods. For example, the technical features of the present specification described above may be performed/supported through the device of FIGS. 1 and/or 6. For example, the technical features of the present specification described above may be applied only to a part of FIGS. 1 and/or 6. For example, the technical features of the present specification described above are implemented based on the processing chips 114 and 124 of FIG. 1, or implemented based on the processors 111 and 121 and the memories 112 and 122 of FIG. 1, may be implemented based on the processor 610 and the memory 620 of FIG. 6. For example, an apparatus/device of the present specification may comprises: a memory; and a processor operatively coupled to the memory, wherein the transceiver is adapted to: transmit a peer-to-peer (P2P) transmission request frame to an access point (AP); receive a P2P transmission response frame from the AP; receive a trigger frame from the AP, wherein the trigger frame includes information related to whether it is for uplink, P2P transmission, or both uplink and P2P transmission; and transmit data to a receiving station (STA), wherein the transmitting STA and the receiving STA are non-AP STAs.

Technical features of the present specification may be implemented based on a computer readable medium (CRM). The CRM proposed by the present specification may comprises at least one computer readable medium (CRM) storing instructions that, based on being executed by at least one processor of a transmitting station (STA) of a wireless local area network (WLAN) system, perform operations comprising: transmitting a peer-to-peer (P2P) transmission request frame to an access point (AP); receiving a P2P transmission response frame from the AP; receiving a trigger frame from the AP, wherein the trigger frame includes information related to whether it is for uplink, P2P transmission, or both uplink and P2P transmission; and transmitting data to a receiving STA, wherein the transmitting STA and the receiving STA are non-AP STAs.

Instructions stored in the CRM of the present specification may be executed by at least one processor. At least one processor related to the CRM of the present specification may be the processors 111 and 121 or the processing chips 114 and 124 of FIG. 1 or the processor 910 of FIG. 9. Meanwhile, the CRM of this specification may be the memories 112 and 122 of FIG. 1, the memory 920 of FIG. 9, or a separate external memory/storage medium/disk.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method performed by a station (STA) of a wireless local area network (WLAN) system, the method comprising:
receiving a trigger frame from an access point (AP), wherein the trigger frame includes 2-bit information, wherein the 2-bit information is set to a first value for the trigger frame initiating a procedure in which the STA only transmits a signal to the AP, wherein the 2-bit information is set to a second value for the trigger frame initiating a procedure in which the STA transmits a signal to the AP or another STA; and
transmitting the signal based on the trigger frame.

2. The method of claim 1, wherein the first value is related to uplink transmission to the AP, and the second value is related to the uplink transmission or peer-to-peer (P2P) transmission.

3. The method of claim 1, wherein the first value is zero.

4. The method of claim 1, wherein the second value is two.

5. The method of claim 1, wherein the 2-bit information is set to three (3) for a reserved value.

6. A station (STA) in a wireless local area network (WLAN) system, the STA comprising:
 a transceiver;
 a processor coupled to the transceiver; and
 a memory coupled to the processor and storing instructions that, when executed by the processor, perform operations comprising:
  receiving a trigger frame from an access point (AP), wherein the trigger frame includes 2-bit information, wherein the 2-bit information is set to a first value for the trigger frame initiating a procedure in which the STA only transmits a signal to the AP, wherein the 2-bit information is set to a second value for the trigger frame initiating a procedure in which the STA transmits a signal to the AP or another STA; and
  transmitting the signal based on the trigger frame.

7. The STA of claim 6, wherein the first value is related to uplink transmission to the AP, and the second value is related to the uplink transmission or peer-to-peer (P2P) transmission.

8. The STA of claim 6, wherein the first value is zero.

9. The STA of claim 6, wherein the second value is two.

10. The STA of claim 6, wherein the 2-bit information is set to three (3) for a reserved value.

11. An Access Point (AP) in a wireless local area network (WLAN) system, the AP comprising:
 a transceiver;
 a processor coupled to the transceiver; and
 a memory coupled to the processor and storing instructions that, when executed by the processor, perform operations comprising:
  transmitting a trigger frame to a station (STA), wherein the trigger frame includes 2-bit information, wherein the 2-bit information is set to a first value for the trigger frame initiating a procedure in which the STA only transmits a signal to the AP, wherein the 2-bit information is set to a second value for the trigger frame initiating a procedure in which the STA transmits a signal to the AP or another STA.

12. The AP of claim 11, wherein the first value is related to uplink transmission to the AP, and the second value is related to the uplink transmission or peer-to-peer (P2P) transmission.

13. The AP of claim 11, wherein the first value is zero.

14. The AP of claim 11, wherein the second value is two.

15. The AP of claim 11, wherein the 2-bit information is set to three (3) for a reserved.

\* \* \* \* \*